Figure 1:
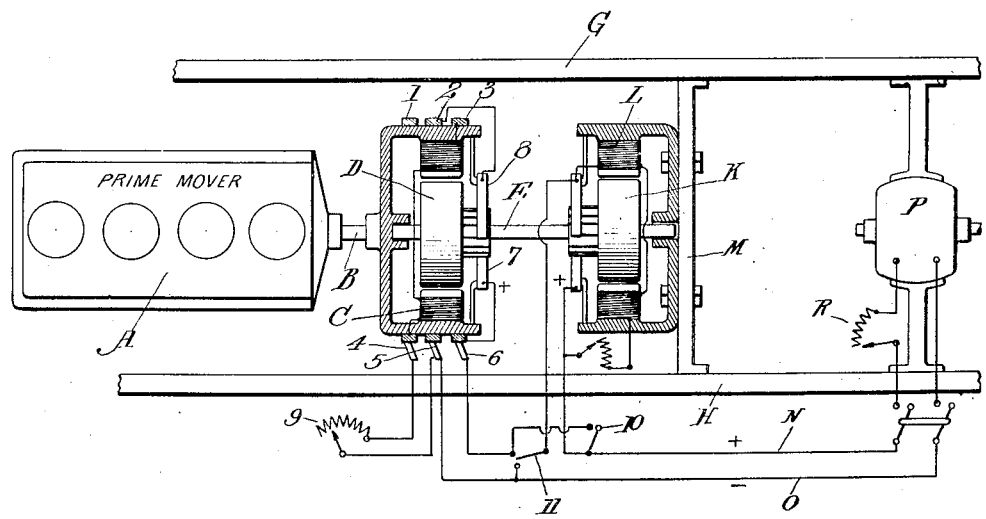

W. MORRISON.
POWER SYSTEM.
APPLICATION FILED SEPT. 7, 1916.

1,366,478.

Patented Jan. 25, 1921.

Witness
G. H. Baker

Inventor
William Morrison

By Byrnes Townsend & Brickenstein
Attorneys

UNITED STATES PATENT OFFICE.

WILLIAM MORRISON, OF CHICAGO, ILLINOIS, ASSIGNOR TO JOHN H. BRICKENSTEIN, OF WASHINGTON, DISTRICT OF COLUMBIA.

POWER SYSTEM.

1,366,478. Specification of Letters Patent. Patented Jan. 25, 1921.

Application filed September 7, 1916. Serial No. 118,871.

*To all whom it may concern:*

Be it known that I, WILLIAM MORRISON, a citizen of the United States, residing at Chicago, in the county of Cook and State of Illinois, have invented certain new and useful Improvements in Power Systems, of which the following is a specification.

My invention relates to a power transmission system comprising a prime mover such as a variable speed gas-engine, a current generating system and an electric motor or motors connected to drive the load, and has for its object to subdivide the energy delivered by the prime-mover among several current-generating units, thereby providing means for compounding or combining the currents delivered to the motor in such manner as to produce the varying torque required to drive a varying load.

It has for its further object to effect this subdivision of the energy furnished by a fast-running prime-mover, such as a gas-engine, in an electrically and mechanically simple and efficient manner by causing the energy developed by the high speed prime mover to be transmitted to a series of dynamo-electric current generators, some of which have both the elements (field-magnet and armature) rotary, the whole power of the engine being used to drive one rotor of the first dynamo, (which rotor may be termed the "driving" member), whose other rotor (which may be termed the "driven" member) is connected to and in turn rotates the "driving" member of the next dynamo and so on to the end of the series, the final member of the last dynamo being preferably fixed. When not permanently fixed, any method of restraining or holding against unrestrained rotary movement may be resorted to.

The speed of rotation of each of the successive "driven" members of the series is less than that of its "driving" member, the sum of these differences of speed being equal to the speed of revolution of the first dynamo-element driven by the prime-mover.

The torque produced by the engine is thus transmitted through the series of generators whose added speeds are equal to that of the first member driven by the prime-mover.

A number of separate generating units are thus provided whose currents can be conveniently combined in multiple, series or series multiple according to the number of the units, and fed to the motor.

My invention is primarily designed for use on a vehicle driven by a gas-engine and provides means for delivering the energy developed by the engine in the form of a torque sufficient to drive the load shaft at any speed required, and without the use of change gearing.

This result I obtain by transmitting the whole power developed by the engine to the first of a series of dynamo-generators electromagnetically coupled in series with each other, restraining the end member of the series sufficiently to cause the generators to produce current and utilizing the current produced to feed the motor. By "electromagnetic coupling" I mean that both the armature and the field of each dynamo are revolubly mounted and that one member of the first dynamo of the series is rigidly connected to one member of the second dynamo, the second member of the second dynamo being connected to one member of the third dynamo, etc.

The currents of the separate dynamo may be connected in series to produce electric current of high voltage and lower amperes capable of producing high speed of the load shaft when speed is required; and may be connected in multiple (or series multiple, when as many as four units are used) to produce a very powerful torque to drive the load shaft in case a powerful effort is required.

For example, when four dynamos are used, they can be connected in series-multiple when twice the torque of the engine and half the speed is required, and all in multiple when four times the torque and one-fourth the speed is required. When the engine is running at its highest effective speed it can deliver the greatest torque effort to the series of dynamos, and the maximum electrical energy is then developed, which can be used in series or multiple as the different torque efforts are required. Within the limits of the power of the engine, any other variations of speed or power-effect may be obtained by varying the speed of the engine or varying the strengths of the dynamo fields, or varying the speed of the motor.

The invention is diagrammatically shown in the accompanying drawing in which—

Figure 2:
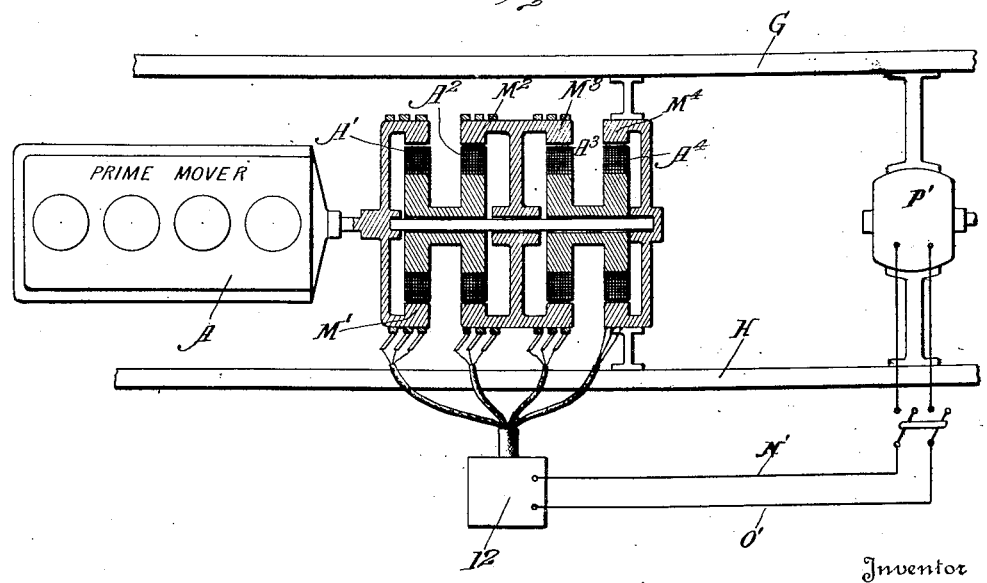

Figure 1 is a plan view of the chassis of an automobile provided with one form of my power transmission system; and Fig. 2 is a diagram of a modification.

In Fig. 1, A is a prime-mover such as a gas-engine of any well-known type, to whose crank shaft B is connected one rotor, (the "driving" element) in this case shown as the rotatable field magnet C, of a double rotor dynamo machine. The armature D, (the "driven" element) of this machine is mounted on a shaft E, supported in any suitable manner and adapted to rotate therewith.

Mounted on this same shaft E is a second armature K, the two armatures thus necessarily rotating at the same speed. The rotating armature K is one rotor of a second generator, whose field magnet L is rigidly supported, as, for example, on a cross-bar M of the frame of the machine.

Current is taken from the first generator by slip rings 1, 2, 3 (shown as mounted on the outside of the rotating field magnet C) by brushes 4, 5, 6, the ring 3 being connected to one brush 7, ring 2 to the other brush 8. This generator is here shown as shunt wound (though a series wound machine may be used if desired), one end of the field coils being connected to brush 7 through ring 3, and the other to ring 1, a variable resistance 9 being connected between brushes 4 and 5, so that the strength of the field may be varied. The second generator is also shown as shunt-wound (though a series wound machine may be used) and as it is a dynamo of the usual type need not be further described.

Current from the two generators is delivered to mains N, O, which are connected, through suitable switches, if desired, to an electric motor, P, mounted on the frame of the machine. The motor or motors, as obviously more than one may be used, if desired, drive the rear axle. A suitable resistance R, or other controlling device, may be used in connection with the motor or motors.

Suitable connections, such as switches 10 and 11, are provided to connect the two generators to the mains N, O, either in series or in multiple.

I have shown for simplicity only two generators, but as many more may be used as desired. Thus if field magnet L be rotatably mounted instead of being fixed, it may in turn drive a third field magnet, also rotatable, which when associated with a third fixed armature will provide a third generator. The system may be further extended in the same manner.

Such a system is diagrammatically shown in Fig. 2, in which the engine A drives field magnet M', which by reaction drives armature A' and armature A² on the same shaft. Armature A² by reaction drives field-magnet M² and field magnet M³ which is directly connected to and rotates with M². The field-magnet M³ drives armature A³, which is on the same shaft with armature A⁴, which forms with the stationary field-magnet M⁴ the fourth or final generator. The current from the four generators is taken by suitable wires to a controller 12, from which lead the mains N', O', to motor P'. The controller 12 is constructed and arranged to provide means for making all the necessary current connections, which need not be here described. No attempt has been made in this figure to show the internal circuits of the dynamos as these are well-known to those skilled in the art. Obviously each of these dynamos may also be provided with field regulating or other controlling means.

Further extension of the system beyond this number of generator units is feasible.

The operation of the system is as follows:—

The several generators have preferably the same characteristics and are preferably designed, at the same difference of speed between the field magnet and armature, to generate the same quantity of current at the same voltage.

Thus, referring to Fig. 1, the field L is stationary while the armature K, for example, revolves at 1000 revolutions per minute. The armature D, being rigidly connected to armature K, also revolves at 1000 revolutions per minute, while the field magnet C is driven by the engine at 2000 revolutions per minute, thus giving a slip-speed of 1000 revolutions per minute in each machine. Referring to Fig. 2, the field-magnet M⁴ is fixed; its armature A⁴ revolves for example at 500 revolutions per minute which is also the rate of rotation of armature A³, which is in turn driven by reaction from field-magnet M³ which is rotating at 1000 revolutions per minute. As field-magnets M³ and M² are rigidly connected, M² also revolves at 1000 revolutions per minute, being driven by its armature A², which is revolving at 1500 revolutions per minute, this being also the speed of the armature A', which is driven by the field-magnet M' rotating at 2000 revolutions per minute, since it is directly driven by the engine at that rate. Thus, the relative speed of rotation between the two rotors of each dynamo is 500 revolutions per minute, while the "driving" members rotate respectively at 2000, 1500, 1000, and 500 revolutions per minute. These speeds are merely examples, as any other suitable speeds may be used.

In each case, therefore, the total energy is divided between a series of similarly operating generators.

Since the first generator of the series is driven by the gas-engine, or other prime-mover, and each succeeding generator is driven in turn through the electromagnetic strain or torque developed by the one ahead of it, it will be evident that each is driven by the same amount of torque, or twisting effort, thus giving a multiplicity of electromagnetic torques each equal to the turning torque of the gas-engine, or prime-mover, which torques produce currents which can be compounded or combined to feed an electric motor to produce a torque many times that of the gas-engine.

I mean by torque the power or strain to turn over or twist a driven shaft.

The great advantage of this system is its capability of producing a great torque effort, by use of a suitable number of units, by which the power of the prime-mover or gas-engine is converted into electrical energy to feed a motor to drive a shaft, without the use of gears, either forward or backward.

The vehicle provided with my system has, therefore, all the flexibility of an electrically driven vehicle.

It is, moreover, possible by this system to drive the electric motor at a speed far in excess of the speed of the engine. For example, on an unobstructed roadway, the motor may be operated at a driving speed far ahead of any speed which the engine could possibly obtain, since it is the electric motor, and not the gas-engine, which is propelling the vehicle. By my system, no change-gearing or other mechanical speed changing devices need be used, the mechanical energy of a high speed engine or other motor being electromagnetically converted into a number of separate currents which are used to drive an electric motor.

While I prefer to have each of the successive dynamos of the series designed for the same generating speed, it is evident that the generators may be designed to operate at different generating speeds.

I claim:—

The combination with a high speed gas engine and a direct current motor, of a plurality of direct current generators electro-magnetically coupled in series with each other, means for connecting one end of the series to the engine, means for restraining the other end of the series sufficiently to cause the generators to produce current, electrical connections between the generators and the motor and means for variably interconnecting the generators to vary the voltage applied to the motor.

In testimony whereof I affix my signature.

WILLIAM MORRISON.